Sept. 15, 1953      G. D. STOUGH      2,652,004
CARGO BRACE STRUCTURE
Filed July 23, 1951      5 Sheets-Sheet 1

INVENTOR.
GERALD D. STOUGH
BY Whittemore,
Hulbert & Belknap
ATTORNEYS

Sept. 15, 1953  G. D. STOUGH  2,652,004
CARGO BRACE STRUCTURE

Filed July 23, 1951  5 Sheets-Sheet 2

INVENTOR.
GERALD D. STOUGH
BY
ATTORNEYS

Sept. 15, 1953     G. D. STOUGH     2,652,004
CARGO BRACE STRUCTURE
Filed July 23, 1951     5 Sheets-Sheet 3

INVENTOR.
GERALD D. STOUGH
BY
ATTORNEYS

Sept. 15, 1953 G. D. STOUGH 2,652,004
CARGO BRACE STRUCTURE
Filed July 23, 1951 5 Sheets-Sheet 4

INVENTOR.
GERALD D. STOUGH
BY *Whittemore*
*Hulbert & Belknap*
ATTORNEYS

Sept. 15, 1953  G. D. STOUGH  2,652,004
CARGO BRACE STRUCTURE
Filed July 23, 1951  5 Sheets-Sheet 5

INVENTOR.
GERALD D. STOUGH
BY Whittemore,
Hulbert & Belknap
ATTORNEYS

UNITED STATES PATENT OFFICE 2,652,004

CARGO BRACE STRUCTURE

Gerald D. Stough, Detroit, Mich., assignor to Whitehead & Kales Company, River Rouge, Mich., a corporation of Michigan Application July 23, 1951, Serial No. 238,099

11 Claims. (Cl. 105—369)

The present invention relates to cargo brace structure comprising an elongated cross bar having at opposite ends thereof movable supporting heads adapted to fit into and interlock in openings provided in a pair of confronting spaced apart side walls. Cargo braces of this type are widely used in railroad cars, trucks, airplanes and the like for bracing cargo against movement during transit. One of the essential requirements of cargo braces of this type is that they shall be positively interlocked with the supporting walls against any possibility of disengagement in transit. The present invention is an improvement over the structure illustrated and described in my prior Patent 2,567,658, granted September 11, 1951, entitled "Cargo-Bracing Structure."

It is an object of the present invention to provide a cargo brace comprising an elongated bar, a supporting head carried at the end of the bar with provision for rocking movement about an axis transverse to the length of the bar, and preferably for movement longitudinally of the bar in conjunction with latch means operable to retain the movable head in supporting position against rocking movement in which the latch means comprises a pair of latch elements carried by a single pivot support located above the head and outwardly of the transverse axis about which the supporting head is adapted to rock.

It is further object of the present invention to provide a structure as described in the preceding paragraph in which the latch elements are interconnected for simultaneous swinging movement to and from released position.

It is a further object of the present invention to provide structure as described above in which the latch elements are interconnected by resilient means normally retaining the latch elements in head supporting position, in which the resilient means constitutes an actuator for releasing the latch elements.

It is further object of the present invention to provide in structure of the character described above an actuating lever secured to one of the latch elements effective to rock the other latch element to released position and to thereby set up a force tending to rock the said one latch element to released position.

It is a further object of the present invention to provide structure of the character described comprising a cross bar, a head carried at one end of the cross bar and secured thereto for rocking movement about an axis transverse to the length of the cross bar, a pair of opposed latch elements including portions adapted to project beneath the head to retain the head in elevated supporting position, and lock means effective to positively lock the latch means against movement to releasing position.

It is a further object of the present invention to provide in structure of the character described in the preceding paragraph, abutment means between the locking means and latch elements effective to swing the latch elements to released position upon movement of the locking means to unlocking position.

It is a further object of the present invention to provide structure as described in the preceding paragraph in which the locking means is provided with a spring urging the locking means toward locking position, and additional abutment surfaces between the locking means and the latch elements effective to cause the spring to bias the latch elements toward latching position when the locking means is released.

Other objects and features of the invention will become apparent as the description proceeds, especially when taken in conjunction with the accompanying drawings, wherein.

Figure 1:
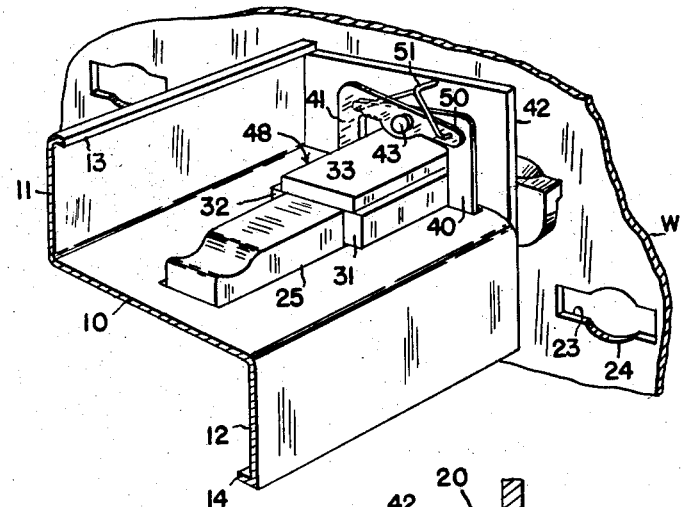
Figure 1 is a fragmentary perspective view of a head supporting assembly adapted to be secured to one end of a cross bar.
Figure 2:
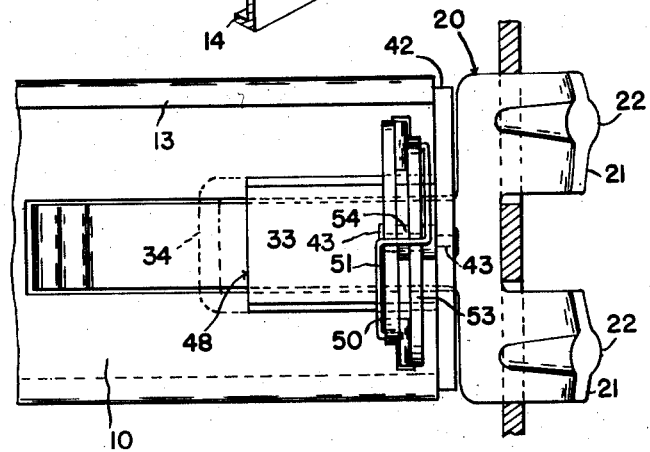
Figure 2 is a plan view of a head supporting structure showing the head engaged in openings in a supported wall.

Referring now to Figures 1–4 there is illustrated a head supporting construction adapted to be secured to the ends of a cross bar. In practice, the cross bar may include an elongated metal bar including a central web 10, vertical flanges 11 and 12, and inturned flanges 13 and 14. The cross bar may be completed by elongated wood bars respectively seated in the spaces between the central web 10 and the flange 11, and between the central web 10 and the flange 12. Cross bars of this type are well known and have the advantage of presenting wood exterior surfaces throughout their length for engagement with cargo.

At the end of the cross bar there is mounted a supporting head 20 which as illustrated herein, comprises a pair of curved hooks 21 each of which is provided with a thickened central rib portion 22. The hooks are shaped to interfit with correspondingly shaped openings 23 provided in a wall W. The openings 23 include enlarged central portions 24 to receive the central thickened rib portions 22 of the hooks 21. The heads 20 include a rearwardly extending shank 25 which is reduced as indicated at 26, to define a forwardly facing shoulder 27 and a rearwardly facing shoulder 28. At the rear end of the head and at its upper surface there is provided a transversely extending recess 29. The recess 29 together with the shoulder 27, defines a stop portion 30 whose function will presently be described.

The movable head 20 is supported in a housing comprising a pair of side walls 31 and 32, and a top wall 33. The side walls 31 and 32 are interconnected by a rear wall 34 having an upper edge 35 (Figure 3) which supports the head 20 for rocking movement about an axis extending transverse to the length of the bar, the axis being determined by the upper edge 35. The head is also movable longitudinally of the bar between limits determined by engagement between the shoulder 27 and the outer surface of the rear wall 34, and between the shoulder 28 and the inner surface of the rear wall 34. Thus, the head 20 may move longitudinally of the bar a distance determined by the spacing of the shoulders 27 and 28 and may rock about an axis determined by the upper surface 35 of the rear wall 34. It will be observed that the inner end of the top wall 33 is spaced outwardly somewhat from the rear wall 34 and defines an opening through which the reduced portion 26 of the head is movable. When the head is moved outwardly of the cross bar until the shoulder 27 engages the rear surface of the wall 34, the head may swing downwardly an amount determined by the engagement of a surface of the recess 29 with the rear or inner surface of the top wall 33.

Figures 3, 4:
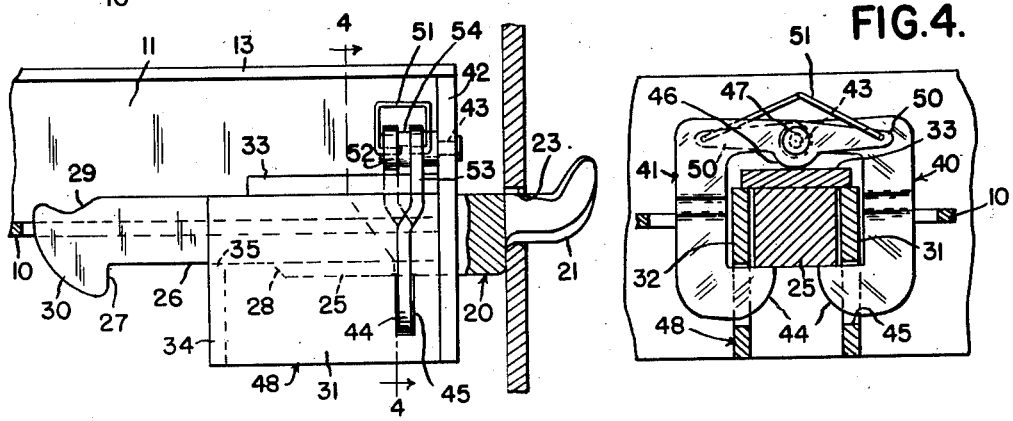
Figure 3 is a side elevation partly in section, of the head supporting structure.
Figure 4 is a section on the line 4—4, Figure 3.

The cargo brace is engaged and interlocked with the opposed walls W of the cargo space by inserting the hooks 21 through the openings 23. Due to the configuration of the hooks the insertion of the hooks must be accompanied by an upward rocking movement of the hooks which is permitted by the construction just described. It will also be observed that when the hooks are engaged in the openings, as best seen in Figure 3, portions of the hooks extend laterally beyond the sides of the openings and specifically, extend above the top of the openings so that it is impossible to withdraw the hooks 21 from the openings 23 without providing for rocking movement of the head.

A pair of latch elements 40 and 41 are provided to retain the head 20 in elevated position and thus to prevent withdrawal of the hook portion 21 of the head from the opening 23. The latch elements 40 and 41 are secured to an endplate 42 which may be welded or otherwise secured to the adjacent elements of the head supporting structure. The latch elements 40 and 41 are illustrated as carried by a pivot pin 43 and each comprises a latch portion 44 adapted to extend below the shank 25 of the supporting head so as to retain the same in elevated position. For this purpose openings 45 are provided in the side walls 31 and 32 as best illustrated in Figures 3 and 4. The upper portions of the latch elements 40 and 41 include enlargements 46 adapted to rest on the upper surface of the top wall 33 and these enlargements are provided with enlarged openings 47 through which the pivot pin 43 extends. Thus, the latch elements 40 and 41 are permitted some movement relative to the pivot pin 43 and in load supporting position the enlargements 46 thereof will rest against the upper surface of the top wall 33 of the housing, the housing being indicated in its entirety by the reference numeral 48.

Each of the latch elements 40 and 41 is also provided with an extending arm 50 and a spring 51 is provided which is connected at its opposite ends to the arms 50. The spring is adapted to apply a force tending to rock the latch elements inwardly so as to retain the latch portions 44 beneath the shank 25 of the supporting head. Pressure applied downwardly to the spring 51 establishes a force in the opposite direction tending to rock the latch elements outwardly so as to release the movable head for downward movement.

When it is desired to release the head the weight of the cross bar will be sustained by the operator while pressure is applied to the spring 51, thus swinging the latch elements outwardly. Thereafter the end of the cross bar may be further elevated accompanied by a downward swinging movement of the head 20, and this in turn will withdraw the hook portion 21 thereof from the opening 24.

It will be observed that the latch portions 44 of the latch elements 40 and 41 are in alignment and the upper portions thereof are oppositely offset as indicated at 52 and 53 to permit mounting the latch elements on a common pivot support. Intermediate the offset portions 52 and 53 of the latch elements there is preferably provided a spacer 54.

Figure 5:
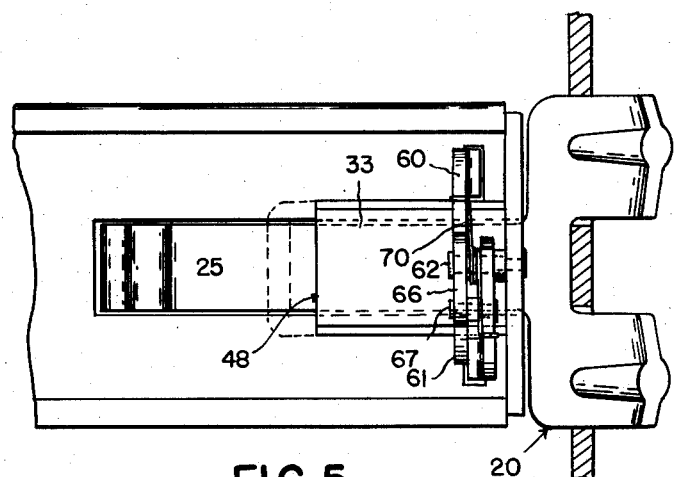
Figure 5 is a plan elevational view of a modified head supporting construction illustrated with the head engaged in openings in the supporting wall.
Figure 6:
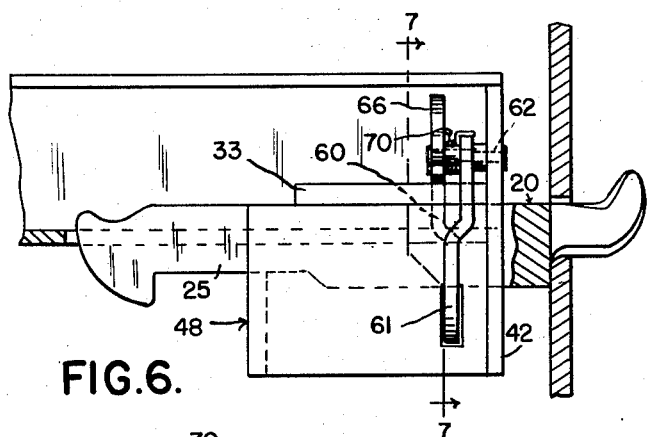
Figure 6 is a side elevation partly in section, of the head supporting construction shown in Figure 5.
Figure 7:
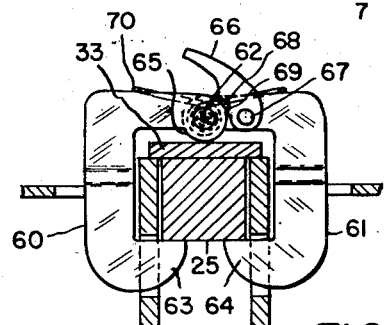
Figure 7 is a section on the line 7—7, Figure 6.

Referring now to the embodiment of the invention illustrated in Figures 5–7, there is illustrated a modified form of the invention. Since the several embodiments of the invention all include an identical supporting housing 48 and supporting head 20, these elements will not be further described.

In the present embodiment of the invention latch elements 60 and 61 are carried by a common pivot support 62 which comprises a pin extending rearwardly or inwardly from the endplate 42. The latch elements 60 and 61 include latch portions 63 and 64 respectively, adapted to underlie the shank 25 of the supporting head 20. Each of the latch elements includes enlargements 65 adapted to rest on the upper surface of the top wall 33 to support the weight of the cargo brace independently of the pivot pin 62. In the present embodiment of the invention an actuating lever 66 is pivoted as indicated at 67, to one of the latch elements, such for example as 61. The other latch element 60 includes a projection 68 cooperating with a recess 69 formed in the actuating lever 66. A biasing spring 70 is provided supported by the pivot pin 62 and includes arms engaging the latch elements 60 and 61 and biasing these latch elements toward latching position.

Pressure applied to actuating lever 66 rocks the latch element 60 outwardly and at the same time sets up a reaction on the latch element 61 tending to move it outwardly. Thus, pressure applied to the actuating lever 66 causes both latch elements to move outwardly to release the supporting head for downward swinging movement.

Figure 8:
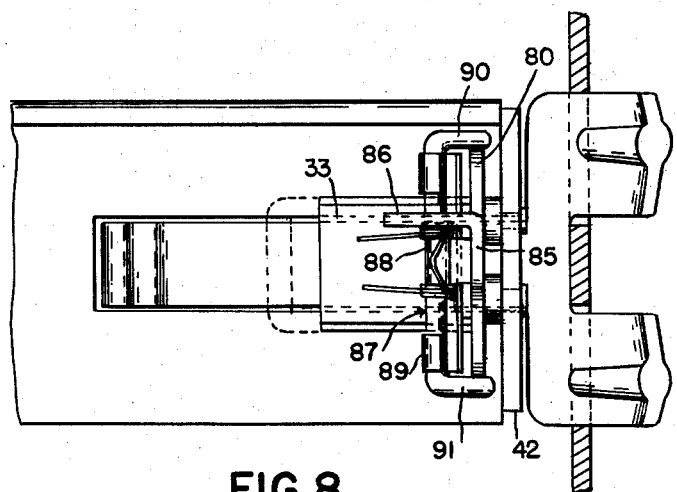
Figure 8 is a plan view of a modified head supporting construction shown with the head engaged in openings in a supporting wall.
Figure 9:
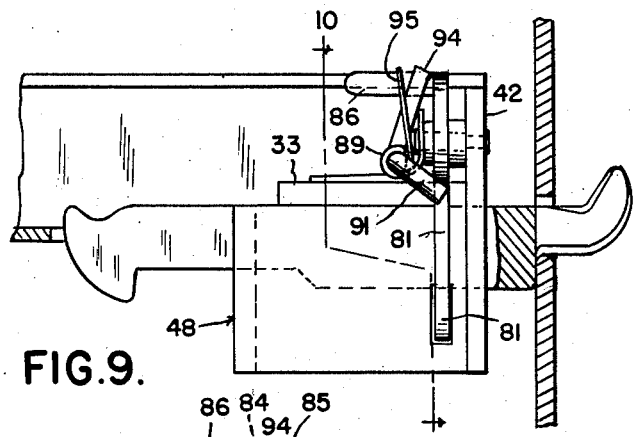
Figure 9 is a side elevation partly in section, of the construction shown in Figure 8.
Figure 10:
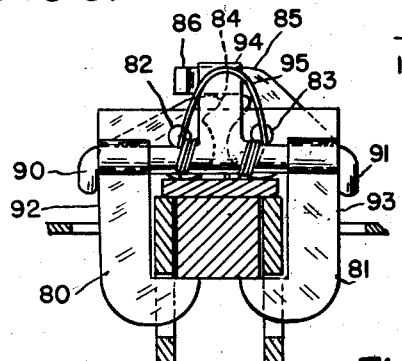
Figure 10 is a section on the line 10—10, Figure 9.
Figure 11:
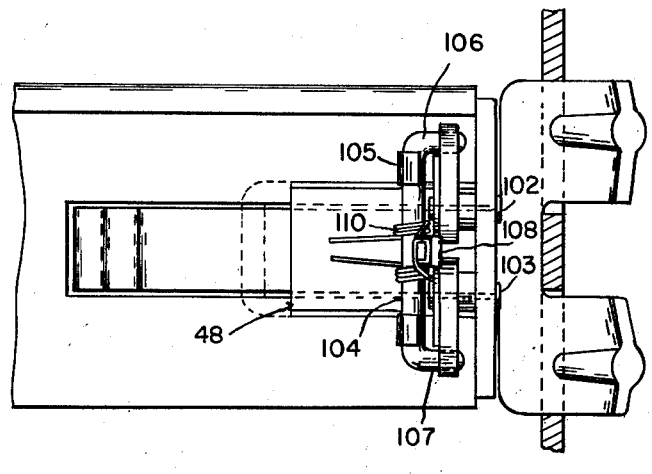
Figure 11 is a plan view of a modified head supporting construction showing the head engaged in openings in a supporting wall.

Referring now to Figures 8–10 there is illustrated another embodiment of the present invention. In this instance means are provided which positively lock the latch elements in latching position. Latch elements 80 and 81 are pivoted as indicated at 82 and 83 respectively, to the endplate 42. The latch element 80 includes a projecting finger 84 adapted to underlie an extension 85 on the latch element 81. The extension 85 includes an inwardly extending actuating finger piece 86. As will be readily apparent from an inspection of Figure 10, pressure applied to the finger piece 86 rocks the latch element 81 in a counterclockwise direction and at the same time will rock the latch element 80 in a clockwise direction about its pivot support 82.

In order to prevent accidental movement of the latch elements 80 and 81 to unlatched or releasing position, a lock indicated generally at 87 is provided. The lock 87 comprises a yoke including a central portion 88 mounted for swinging movement in brackets 89 secured to the top wall 33 of the housing 48. The yoke comprises a pair of spaced locking arms 90 and 91 which are adapted to engage the outer surfaces 92 and 93 respectively of the latch elements 80 and 81. The lock also includes an upwardly extending actuating finger 94 by means of which the arms 90 and 91 may be swung about the axis of the transversely extending portion 88 of the lock.

As best seen in Figure 10, when the arms 90 and 91 engage the outer surfaces 92 and 93 of the latch elements 80 and 81 respectively, below the plane containing the axis of the pivot supports 82 and 83, the latch elements are positively locked against outward movement. However, when the finger piece 94 is swung counterclockwise, as seen in Figure 9, the locking arms 90 and 91 are swung upwardly to a position in or above the horizontal plane containing the axis of the pivots 82 and 83, thus permitting outward swinging movement of the latch elements. A spring 95 is provided biasing the lock construction to the position illustrated in the figures, and tending to restore the lock construction to this position when the finger piece 94 is released. It will be apparent that release of the finger piece 94 when the latch elements 80 and 81 are in outward position, establishes a force tending to restore the latch elements to the illustrated position. Thus, the spring 95 is effective to retain the lock in locking position, to swing the latch elements from releasing or unlatched position to latched position, and to move the lock mechanism from unlocked to locked position. However, in the embodiment illustrated manual movement of the lock mechanism to unlocking position does not automatically move the latch elements to unlatched position and it is accordingly necessary in this embodiment of the invention to swing the finger piece 94 of the lock mechanism to unlocked position and also to apply pressure to the finger piece 86 of the latch mechanism to release the latches.

Figure 12:
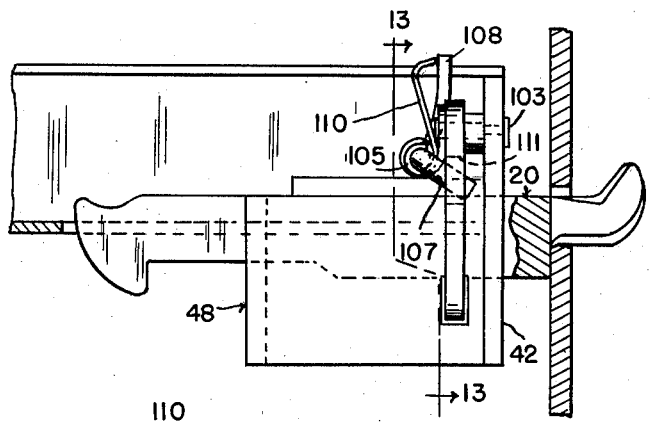
Figure 12 is a side elevation partly in section, of the head supporting construction shown in Figure 11.
Figure 13:
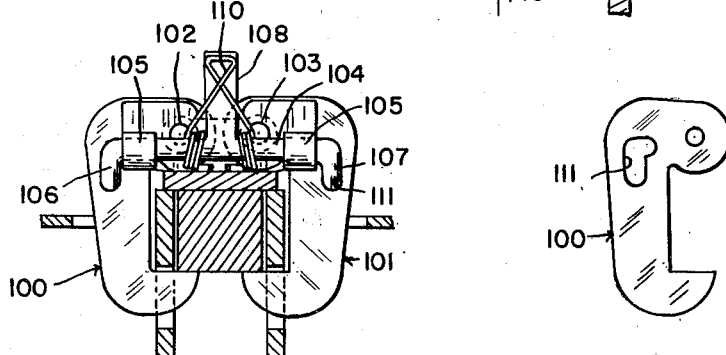
Figure 13 is a section on the line 13—13, Figure 12.

Referring now to Figures 11–14 there is illustrated another embodiment of the present invention. In this embodiment of the invention a pair of latch elements 100 and 101 are mounted on independent pivot pins 102 and 103 carried by the endplate 42. Lock mechanism comprising a transverse portion 104 mounted in pivot supports 105 is provided which includes locking arms 106 and 107. Extending upwardly from the transverse portion 104 of the lock is an actuating finger 108. A spring 110 is provided having an intermediate portion coiled around the transverse portion 104 of the lock and an upwardly extending portion bearing against the actuating finger piece 108 of the lock mechanism, tending to swing the lock clockwise as seen in Figure 12, to locking position.

Figure 14:
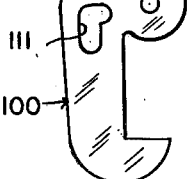
Figure 14 is an elevational view of one of the latch elements included in the head supporting construction shown in Figures 11–13.
Figure 15:
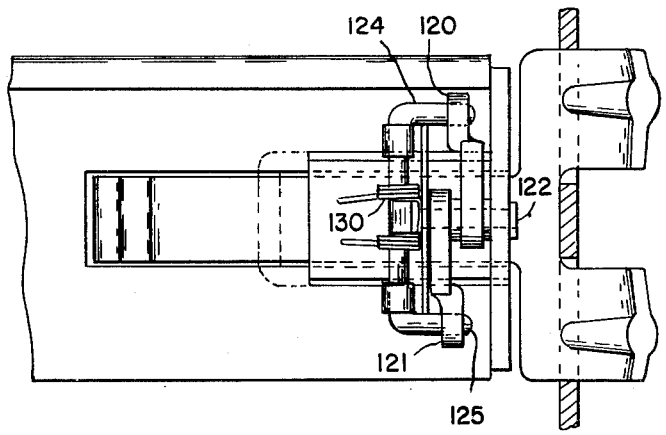
Figure 15 is a plan view of a modified head supporting construction showing the head engaged in openings in a supporting wall.

In this embodiment of the invention the latch elements 100 and 101 are provided with openings 111 into which the ends of the arms 106 and 107 extend. The openings 111, as best seen in Figure 14, are of L-shape to accommodate vertical swinging movement of the arms 106 and 107 in conjunction with inward and outward swinging movement of the latch elements. Moreover, the openings 111 provide abutment surfaces engageable by the arms 106 and 107 in both upward swinging movement and downward swinging movement to cause movement of the locking device toward unlocked position to mechanically swing the latch elements 100 and 101 outwardly, and effective on movement of the lock mechanism toward locking position to establish a resilient force through the spring 110 tending to swing the latch elements 100 and 101 to the latching position illustrated in Figure 13.

Figure 16:
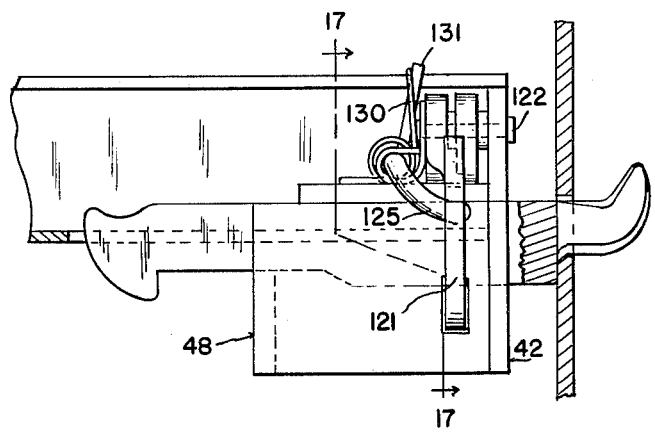
Figure 16 is a side elevation partly in section, of the head supporting construction shown in Figure 15.
Figures 17, 18:
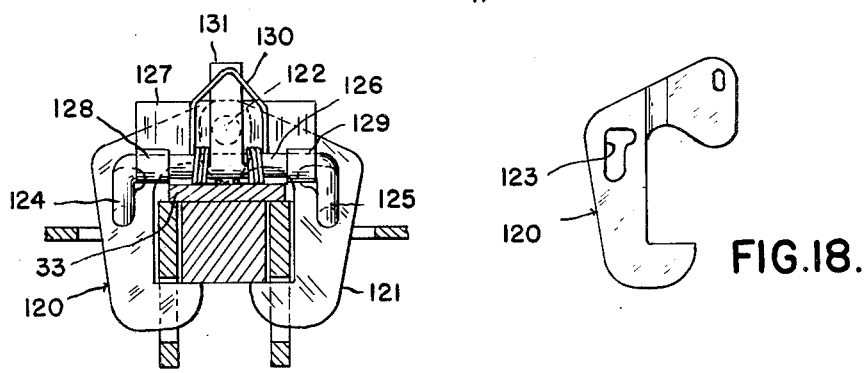
Figure 17 is a section on the line 17—17, Figure 16.
Figure 18 is an elevational view of a latch element embodied in the construction illustrated in Figures 15–17.

Referring now to the embodiment of the invention illustrated in Figures 15–18, latch elements 120 and 121 are mounted on a single pivot pin 122 extending inwardly from the endplate 42. Each of the latch elements, as indicated in Figure 18, includes an opening 123 into which extend the locking arms 124 and 125. The arms 124 and 125 comprise a yoke and are connected by a transverse element 126 mounted in a pivot support 127 having ears 128 and 129. The pivot support 127 may be secured by welding or the like, to the top wall 33 of the housing 48. A spring 130 is provided which engages the inner side of an actuating finger 131 rigidly connected to the transverse element 129 of the locking yoke. The spring 130 biases the actuating finger 131 in a clockwise direction as seen in Figure 16, thus urging the locking arms 124 and 125 downwardly to locking position.

As in the embodiment described above, the openings 123 are of generally L-shape to accommodate vertical swinging movement of the latch elements. Moreover, upward swinging movement of the locking arms 124 and 125 engages the top of the openings 123 and mechanically swings the latch elements 120 and 121 outwardly to releasing position. At the same time, release of the actuating finger 131 permits the spring 130 to establish a force tending to move the locking arms 124 and 125 downwardly, which in turn establishes a resilient force tending to swing the latch elements 120 and 121 inwardly. In this embodiment, as in that previously described, the locking arms 124 and 125 when in locking position, engage surfaces of the openings 134 substantially below the axis of the pivot pin 122 and thereby positively lock the latch elements 120 and 121 from outward swinging movement. In this embodiment of the invention, as in all others, the portions of the latch element directly beneath the pivot pin supporting the latch elements are enlarged to rest directly upon the upper surface of the top wall 33 so that the load supported by the latch elements is transferred directly to the top wall 33 and the pivot pin 122 is thereby not required to support the load. This is of particular importance since cargo braces of this type may in some cases be employed to supporting flooring on which cargo is transported, with the result that substantial vertical loads may be applied to the cargo braces.

The drawings and the foregoing specification constitute a description of the improved cargo brace structure in such full, clear, concise and exact terms as to enable any person skilled in the art to practice the invention, the scope of which is indicated by the appended claims.

What I claim as my invention is:

1. A cargo brace comprising a bar having a horizontal web provided with a centrally located slot extending inwardly from one end of said web, a vertical end plate secured to said bar and having a vertical slot extending upwardly from the bottom edge of said end plate in registration with the slot in said web, a pair of vertically disposed plates at the sides of said slot, a pivot plate connecting the inner ends of said side plates below the top thereof, an abutment plate connecting the tops of said side plates forwardly of said pivot plate, an elongated head having an intermediate shank extending between said plates overlying said pivot plate and underlying said abutment plate, a hook on the outer end of said head, an enlargement on the inner end of said head engageable with the upper edge of said pivot plate and the rear edge of said abutment plate to prevent removal of said head from said bar and limiting downward swinging movement of the hook end of said head relative to said bar, said end plate extending upwardly above said abutment plate, a pair of latch elements pivoted to said end plate above said head for lateral swinging movement, said latch elements having hook portions adapted to underlie said head outwardly from said pivot plate.

2. Structure as defined in claim 1 comprising a single pin extending inwardly from said end plate on which both of said latch elements are pivoted.

3. Structure as defined in claim 2, said latch elements comprising horizontally extending arms pivoted to said pin intermediate the ends thereof, arms depending from one end of said horizontally extending arms and terminating in said hook portions, and a spring interconnecting the other ends of said arms and extending upwardly therefrom to an elevated intermediate portion, said spring being biased to bias said elements to latched position, pressure on said elevated intermediate portion of said spring being effective to move said elements to released position.

4. A cargo brace comprising a bar having a supporting head pivoted thereto adjacent an end of said bar and extending beyond the end of said bar, an abutment on said bar engageable with said head at a point spaced from the pivot mounting of said head to limit pivotal movement of said head in one direction, a latch pivoted to said bar and having a hook portion to engage said head at the side opposite said abutment to hold said head against pivotal movement away from said abutment, said latch element having a rigid portion spaced from its pivot mounting directly engageable with a rigid portion of said bar to relieve the pivot mounting of said element of strain.

5. A cargo brace comprising a bar, a head extending beyond an end of said bar, a pivot mounting on said bar for said head and spaced inwardly from the end of said bar, an abutment on said bar located outwardly of said pivot mounting and engageable by said head to limit upward swinging thereof, a second pivot mounting on said bar located above said bar outwardly from said first pivot mounting, a latch element carried by said second pivot mounting for rocking movement in a plane transverse to said bar, said latch element having a hook portion engageable with the underside of said bar, said latch element including a rigid portion directly engageable with a rigid portion of said bar spaced from said second pivot mounting to relieve said second pivot mounting of strain.

6. Structure as defined in claim 5, the connection between said latch lever and second pivot mounting being a loose connection, said latch element comprising a portion directly engageable with an upwardly disposed surface of said bar to prevent the transfer of forces applied tending to swing said head downwardly to said second pivot mounting.

7. Structure as defined in claim 6 in which said second pivot mounting comprises a pivot pin, and said latch element has an enlarged opening in which said pin is located providing for limited movement of said latch element.

8. Structure as defined in claim 7 in which a pair of latch levers are carried by said pin.

9. A cargo brace adapted to extend between a pair of opposed walls, said brace comprising an elongated bar, an elongated supporting head extending beyond one end of said bar and adapted to be engaged by one of the walls, said head being connected to said bar for pivoting movement about an axis transverse to said bar and spaced inwardly from the said end of said bar, an abutment on said bar above said head located between the pivot axis of said head and the said end of said bar, a pivot support on said bar above said head located intermediate said transverse axis and the said end of said bar, and a pair of opposed latch jaws pivoted on said pivot support for swinging movement about an axis parallel to said bar, said jaws having latch portions thereon adapted to underlie said head to prevent downward swinging movement thereof in a direction away from said abutment.

10. A cargo brace as defined in claim 9 in which said head is connected to said bar for movement longitudinally of said bar.

11. A cargo brace as defined in claim 10 in which the pivot support for said latch jaws comprises a single pin, and said latch jaws include enlarged openings in which said pin is received, thereby providing for limited movement of said latch jaws in a plane perpendicular to said pin, said latch jaws including enlarged portions adapted to rest directly on upwardly disposed surfaces of said bar to thereby relieve said pin of strain resulting from forces applied to said head tending to move said head away from said abutment while said jaws are in latching position.

GERALD D. STOUGH.

No references cited.